(12) United States Patent
Schadt et al.

(10) Patent No.: US 8,290,252 B2
(45) Date of Patent: Oct. 16, 2012

(54) IMAGE-BASED BACKGROUNDS FOR IMAGES

(75) Inventors: Gyorgy K. Schadt, Redmond, WA (US); Steven C. Glenner, Bellevue, WA (US); Andrew C. Wassyng, Seattle, WA (US); William X. Yang, Sammamish, WA (US); J. Anthony East, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 12/200,049

(22) Filed: Aug. 28, 2008

(65) Prior Publication Data

US 2010/0054584 A1 Mar. 4, 2010

(51) Int. Cl.
*G06K 9/00* (2006.01)
*G06K 9/38* (2006.01)

(52) U.S. Cl. .................... 382/162; 382/168; 382/172

(58) Field of Classification Search .................. None
See application file for complete search history.

(56) References Cited

U.S. PATENT DOCUMENTS

| | | | |
|---|---|---|---|
| 5,220,620 A | 6/1993 | Nakano | |
| 5,608,851 A * | 3/1997 | Kobayashi | 345/591 |
| 5,608,853 A | 3/1997 | Dujari | |
| 5,930,009 A | 7/1999 | Sato | |
| 6,317,128 B1 | 11/2001 | Harrison et al. | |
| 6,522,780 B1 * | 2/2003 | Pass et al. | 382/170 |
| 6,529,202 B2 * | 3/2003 | Wu | 345/593 |
| 7,064,759 B1 | 6/2006 | Feierbach | |
| 7,080,784 B2 | 7/2006 | O'Keeffe et al. | |
| 7,092,573 B2 | 8/2006 | Luo et al. | |
| 7,386,185 B2 | 6/2008 | Watanabe | |
| 7,653,261 B2 * | 1/2010 | Blake et al. | 382/284 |
| 7,809,185 B2 * | 10/2010 | Li et al. | 382/155 |
| 2004/0120576 A1 | 6/2004 | Kim | |
| 2006/0197985 A1 * | 9/2006 | Yoda et al. | 358/1.18 |
| 2006/0268363 A1 | 11/2006 | Meinders | |
| 2007/0257943 A1 | 11/2007 | Miller | |
| 2008/0084429 A1 | 4/2008 | Wissinger | |
| 2008/0143739 A1 | 6/2008 | Harris et al. | |
| 2008/0165290 A1 | 7/2008 | Li | |

OTHER PUBLICATIONS

Anand, Monica et al., "Shade matching in fixed prosthodontics using instrumental color measurements and computers", Retrieved from <http://www.jprosthodont.com/article.asp?issn=0972-4052;year=2007;volume=7;issue=4;spage=179;epage=183;aulast=Anand>, pp. 179-183.

Chen, et al.,"Gray-Level Grouping (GLG): An Automatic Method for Optimized Image Contrast Enhancement—Part II: The Variations", IEEE Transactions on Image Processing, Vol. 15, No. 8, August 2006, pp. 2303-2314.

Osareh, Alireza et al., "Automatic Recognition of Exudative Maculopathy using Fuzzy C—Mean Clustering and Neural Networks", Medical Image Understanding and Analysis, Jul. 2001, Available at <http://www.cs.bris.ac.uk/Publications/Papers/1000553.pdf>,(Jul. 2001),4 pages.

\* cited by examiner

*Primary Examiner* — Li Liu
(74) *Attorney, Agent, or Firm* — Wolfe-SBMC

(57) ABSTRACT

In accordance with one or more aspects of the image-based backgrounds for images, an image is analyzed in order to identify a color that represents the image. An enhanced background is generated based at least in part on the identified color, and both the image and the enhanced background are output on a screen. In addition, or alternatively, the identified color can be saved as being associated with the image in order to be used to generate an enhanced background for the image when the image is displayed.

20 Claims, 7 Drawing Sheets

IMAGE-BASED BACKGROUNDS FOR IMAGES

BACKGROUND

Computers are becoming an increasingly popular platform for displaying and storing pictures. Oftentimes, however, the pictures being displayed or printed by the computer do not fill up the entire output area, leaving a background area that does not complement the image. For example, the screen or window in which pictures are displayed may have a white, blue, or other fixed-color background. This can be problematic as it can detract from the user experience when viewing images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the image-based backgrounds for images, an image is analyzed in order to identify a color that represents the image. An enhanced background is generated based at least in part on the identified color, and both the image and the enhanced background are output on a screen.

In accordance with one or more aspects of the image-based backgrounds for images, an image is analyzed to identify a color that represents the image, the color being based at least in part on a prominent color of the image or a general hue of the image. The identified color is saved as being associated with the image in order to be used to generate an enhanced background for the image when the image is displayed.

BRIEF DESCRIPTION OF THE DRAWINGS

The same numbers are used throughout the drawings to reference like features.

DETAILED DESCRIPTION

Image-based backgrounds for images are described herein. An image to be displayed is analyzed in order to identify a color that represents a general tone of the image. This identified color is then used to generate an enhanced background to be displayed with the image. The enhanced background can display, for example, a gradient of colors transitioning from the identified color in a central portion of the display to black along the edges of the display, creating a halo effect around the image.

Figure 1:
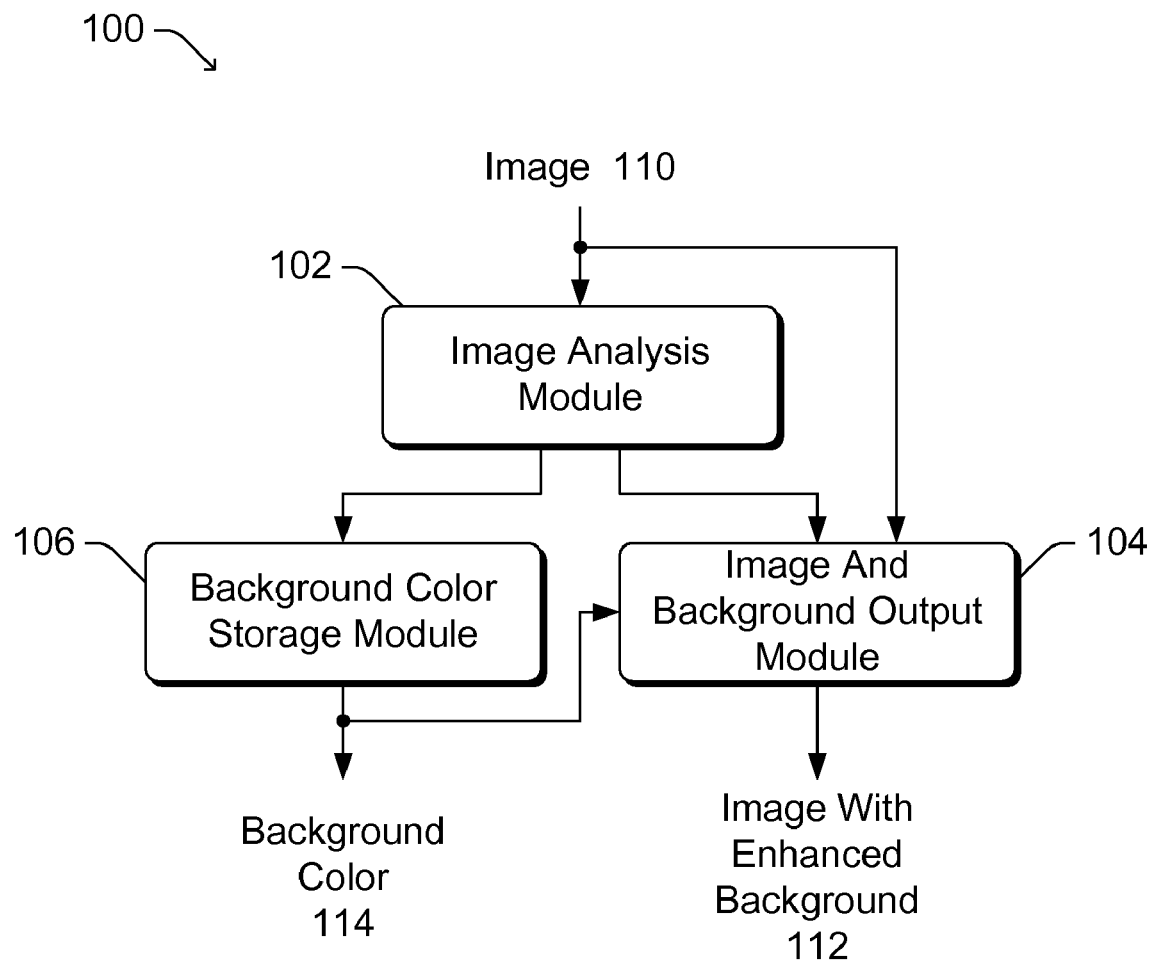
FIG. 1 illustrates an example system implementing the image-based backgrounds for images in accordance with one or more embodiments.

FIG. 1 illustrates an example system 100 implementing the image-based backgrounds for images in accordance with one or more embodiments. System 100 includes an image analysis module 102, an image and background output module 104, and a background color storage module 106. Modules 102, 104, and 106 are implemented in one or more devices. Examples of such devices include a desktop computer, a server computer, a personal digital assistant or handheld computer, a mobile station, an entertainment appliance, a set-top box communicatively coupled to a display device, a television, a cellular or other wireless phone, a game console, an automotive computer, a digital or video camera, a digital picture frame, and so forth. Thus, a computing device implementing one or more of modules 102, 104, and 106 can range from a full resource device with substantial memory and processor resources (e.g., personal computers, game consoles) to a low-resource device with limited memory and/or processing resources (e.g., traditional set-top boxes, handheld game consoles).

Image analysis module 102 can obtain an image 110 in a variety of different manners. By way of example, module 102 can obtain image 110 by retrieving image 110 from a device such as a storage device or an image capture device, by being passed image 110 from another module or device, and so forth. Module 102 analyzes image 110 to identify a color that represents a general tone of image 110. This general tone can be, for example, a color that is expected to be perceived by humans as a most prominent color in the image, a color that is expected to be perceived by humans as a general hue of the image, and so forth. Examples of how this color can be identified are discussed in more detail below.

The color identified by image analysis module 102 can then be used by image and background output module 104 in outputting the image and enhanced background, and/or by background color storage module 106 to store the identified color. Image and background output module 104 outputs an image with enhanced background 112, which is image 110 with an enhanced background based on the color identified by image analysis module 102. In one or more embodiments, module 104 outputs the image with enhanced background 112 directly to a screen. This screen could be, for example, at least a portion of a display screen of a monitor, at least a portion of a screen on which a projector projects images and backgrounds, and so forth. Alternatively, module 104 can communicate signals via a wired and/or wireless transmission medium to another display component, module, or device that outputs the image with enhanced background 112 to a screen.

Background color storage module 106 outputs the background color 114 for image 110. This background color 114 is the color identified by image analysis module 102. Background color 114 can be stored and subsequently accessed by image and background output module 104 in order to generate the enhanced background based on the color identified by image analysis module 102. In such situations, as the background color has already been identified, image 110 can be obtained by module 104 (analogous to the manner in which module 102 can obtain the image, as discussed above) without the analysis of module 102 being repeated. Background color 114 can be stored in a variety of different manners, such as in a metadata field accompanying or part of image 110, in a separate database or other record, and so forth.

It should be noted that modules 102, 104, and 106 can be implemented in one computing device or alternatively implemented across multiple computing devices. A single computing device need not implement all three modules 102, 104, and 106. For example, modules 102 and 106 could be implemented in one computing device (e.g., a server computer, a digital camera, etc.) while module 104 is implemented in another computing device (e.g., a desktop computer, a wireless phone, a digital picture frame, etc.). By way of another example, module 102 and module 104 can be implemented in one computing device without module 106.

Figure 2:
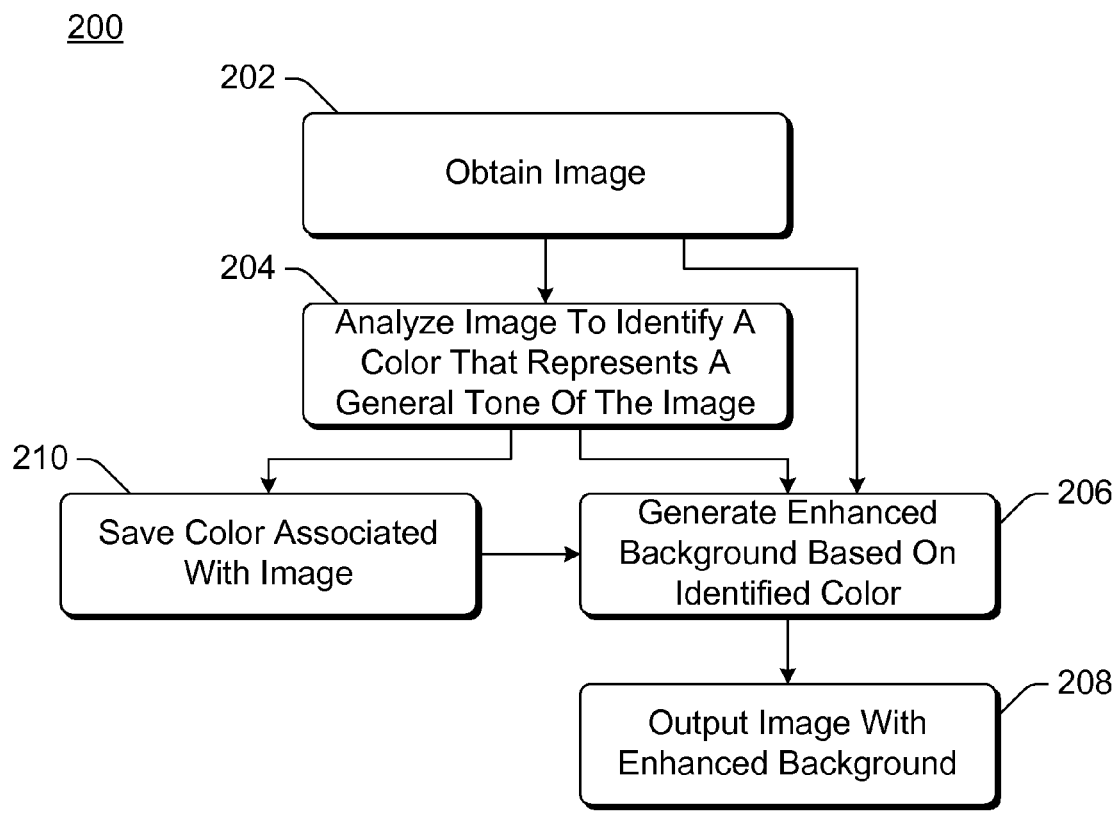
FIG. 2 is a flowchart illustrating an example process for implementing image-based backgrounds for images in accordance with one or more embodiments.

FIG. 2 is a flowchart illustrating an example process 200 for implementing image-based backgrounds for images in accordance with one or more embodiments. Process 200 is carried out by a device, such as a device implementing one or more of modules 102, 104, and 106 of FIG. 1, and can be implemented in software, firmware, hardware, or combinations thereof. Process 200 is an example process for implementing image-based backgrounds for images; additional discussions of implementing image-based backgrounds for images are included herein with reference to different figures.

In process 200, an image is obtained (act 202). As discussed above, the image can be obtained by retrieving the image, having the image passed in, and so forth. The obtained image is then analyzed to identify a color that represents the image (act 204), which is typically a color that represents a general tone of the image. As discussed above, this general tone can be a color that is expected to be perceived by humans as a most prominent color in the image, a color that is expected to be perceived by humans as a general hue of the image, and so forth.

Process 200 can then proceed in one or both of two different paths. In one path, the image with an enhanced background is output. This path is illustrated in process 200 with acts 206 and 208. Following this path, an enhanced background based on the identified color is generated (act 206). This enhanced background can be generated in a variety of different manners.

In one or more embodiments, the enhanced background is generated by beginning with the color identified in act 204. This identified color is used as the color at a central point or region of the screen where the image is to be displayed. A gradient pattern is then used to transition from the identified color to black extending out from the central point or region to the edges of the screen. Accordingly, the pixels at the central point or region of the screen will have the identified color while the pixels at the edges of the screen will be black. The image is then displayed on top of this generated background, generally in the center of the screen. Accordingly, the image typically overlays the central point or region having the identified color. As a result, a halo effect appears as the background for the image.

Figure 3:
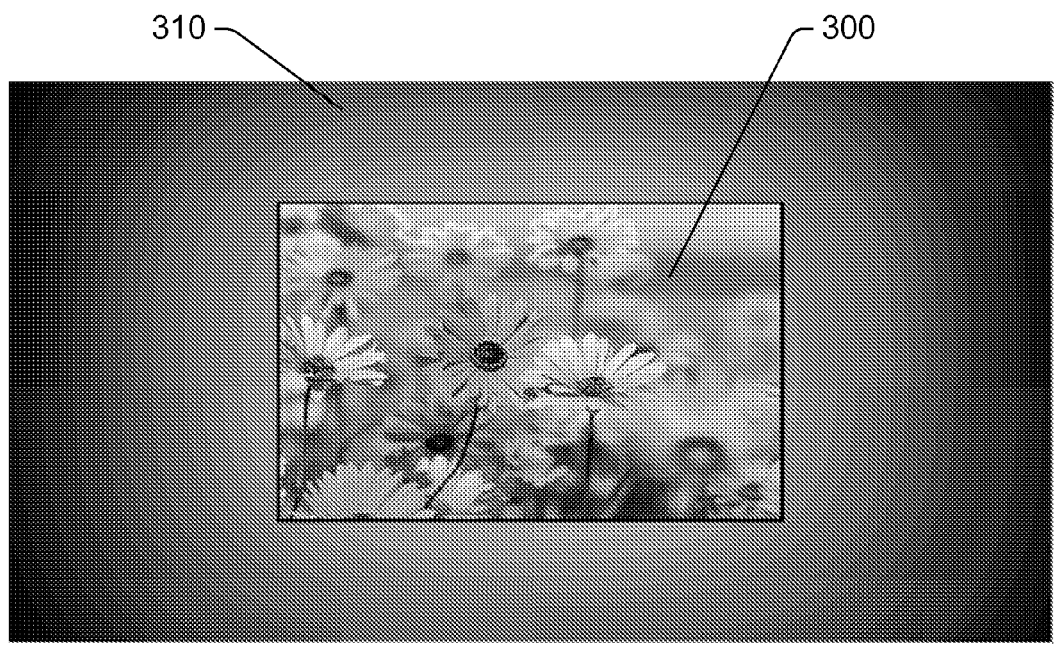
FIGS. 3, 4, 5, and 6 illustrate examples of images on enhanced backgrounds in accordance with one or more embodiments.
Figure 4:
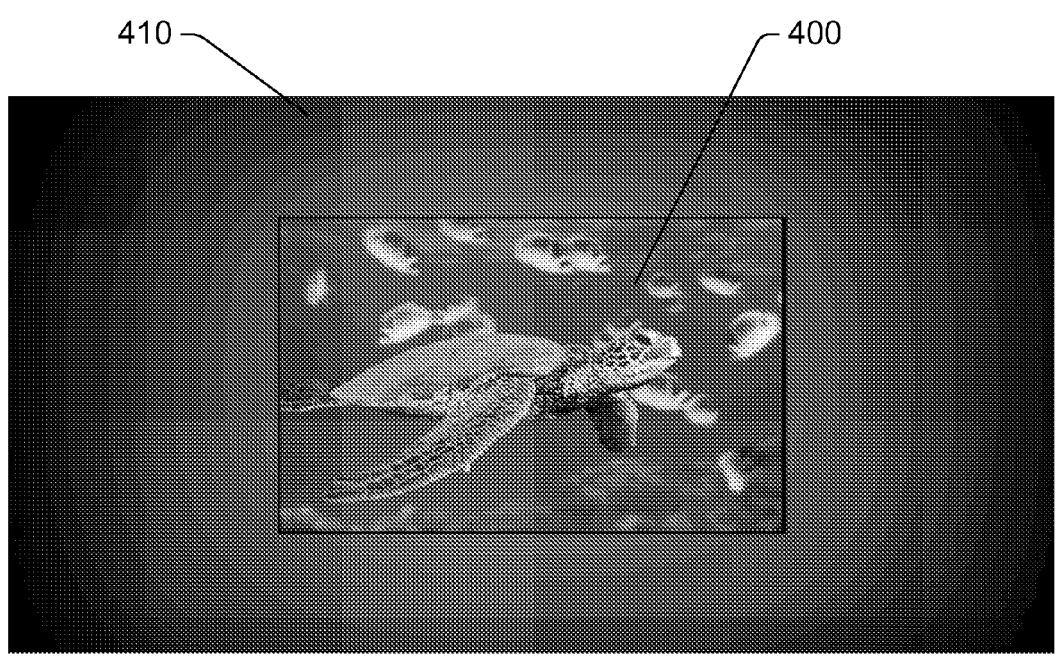

FIGS. 3 and 4 illustrate example images on enhanced backgrounds in accordance with one or more embodiments. In FIG. 3, yellow-orange flowers shown in an inner image 300 are surround by a yellowish-orange outer region 310 to complement the flowers depicted in inner image 300. This outer region 310 is the enhanced background for image 300. Similarly, a predominately blue-green aquatic inner image 400 shown in FIG. 4 is surrounded by a bluish outer region 410. This outer region 410 is the enhanced background for image 400. These outer regions 310 and 410 begin with a color representing the general tone of the images 300 and 400 respectively, and transition to black at the outer edges of regions 310 and 410.

Returning to FIG. 2, the gradient and halo effect can be generated in a variety of different manners. In one or more embodiments, a template is generated that includes a grayscale version of the enhanced background. The template is then used as a semi-transparent mask overlaying the color identified in act 204, converting the grayscale version of the enhanced background to a version based on the identified color. The template can be overlaid on the color in a variety of different manners, such as by using Dynamic HTML (HyperText Markup Language). It is to be appreciated that Dynamic HTML is only an example of the manner in which the template can be overlaid on the color, and that other techniques can alternatively be used. The template can be generated in different manners based on the desires of the designer of the template, such as manually, using a variety of different algorithms, and so forth.

In other embodiments, the gradient and halo effect is calculated beginning with the color identified in act 204. The value of this color identified is then transitioned or shaded to black along the edges of the screen in accordance with one or more of a variety of different conventional gradient algorithms or techniques.

Additionally, it should be noted that the enhanced background can display other visual effects in addition to, or in place of, the halo effect. By way of example, colors or lines may be altered in a circular manner about the center of the enhanced background to create visual effects of swirls, waves, and so forth. Other visual effects can also be incorporated into the enhanced background based on the desires of the designer of the background.

Figure 5:
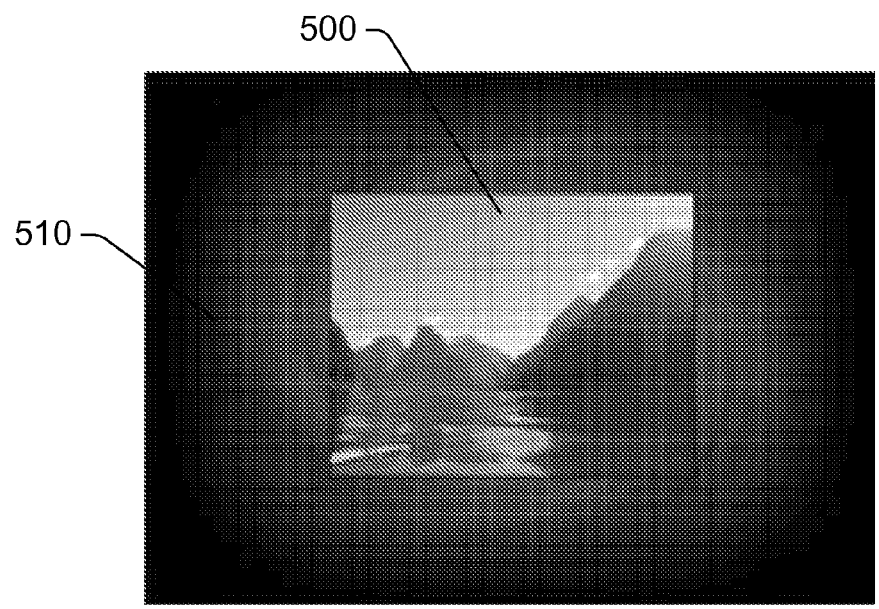
Figure 6:
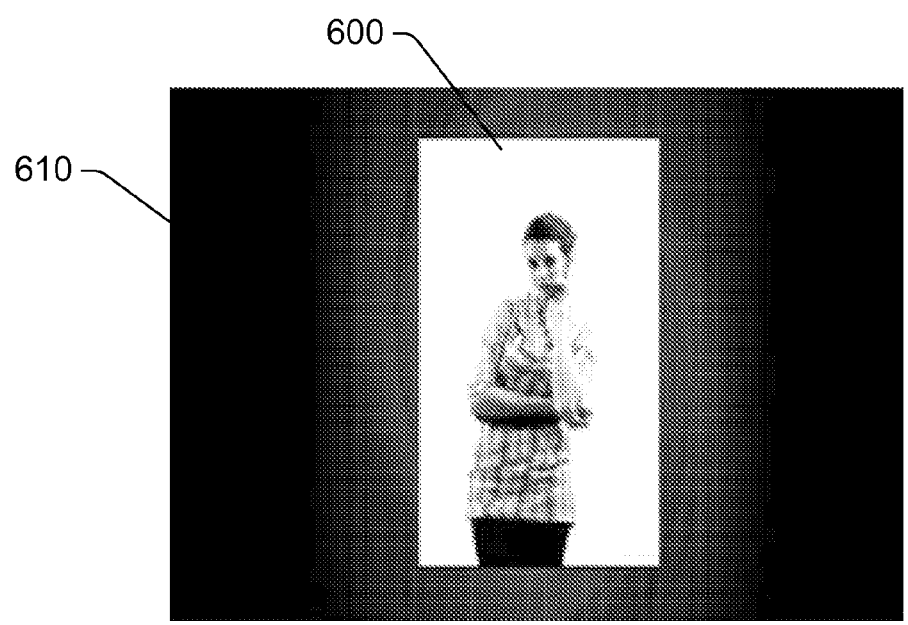

FIGS. 5 and 6 illustrate example images on enhanced backgrounds in accordance with one or more embodiments. The enhanced backgrounds in FIGS. 5 and 6 have different gradients than those shown in FIGS. 3 and 4. In FIG. 5, a bluish lake and sky scene is shown in an inner image 500 surround by a bluish swirl patterned outer region 510 to complement the scene depicted in inner image 500. This outer region 510 is the enhanced background for image 500. Similarly, a predominately black and white image 600 of a person shown in FIG. 6 is surrounded by a brownish swirl outer region 610. This outer region 610 is the enhanced background for image 600. These outer regions 510 and 610 begin with a color representing the general tone of the images 500 and 600 respectively, and transition to black at the outer edges of regions 510 and 610.

After the enhanced background based on the identified color is generated in act 206, the obtained image is output with the enhanced background (act 208). Examples of such images with the enhanced background are discussed above with reference to FIGS. 3-6. In one or more embodiments, the image is also resized prior to being output in act 208. Images can be resized to a particular one or more image sizes so that different images are displayed all having approximately the same size.

Additionally, in one or more embodiments the identified color is used in other manners in addition to generation of the enhanced background. Other aspects of a user interface and/or the display of the image can be altered based on the identified color. For example, the color of controls (such as pause, play, stop, and so forth) displayed to the user can be changed to be (or be based at least in part on) the identified color.

As discussed above, after act 204 process 200 can proceed in one or both of two different paths. In one path, the image with an enhanced background is output as discussed above. In the other path, the color identified in act 204 is saved as being associated with the obtained image (act 210). This path allows, for example, the color that represents the general tone of the image to be identified and saved for use when the image is subsequently output. Following this path, the obtained image with enhanced background can be, but need not be, output. For example, acts 206 and 208 can be performed immediately after, or concurrently with, act 210. By way of another example, acts 206 and 208 can be performed at a later time (e.g., hours, days, weeks, etc.) after act 210 is performed. This is illustrated in FIG. 2 at acts 206 and 208, in which the image is obtained (act 202) and the enhanced background generated (act 206) given the saved color associated with the image (act 210).

In act 210, the color associated with the obtained image can be saved in a variety of different manners. In one or more embodiments, a data structure that stores the image data for the obtained image includes one or more metadata fields in which the identified color can be stored. Accordingly, whenever this data structure is transferred from one device to another, the identified color is also transferred. In other embodiments other techniques can be used, such as maintaining a database or other record that identifies images and the identified color that is associated with each of those images, encoding the identified color in the image (e.g., using one or more of a variety of different watermarking techniques), and so forth.

In one or more embodiments, process 200 is performed by a server device or other computing device in order to identify and save a color that represents the general tone of the image. This saved color is then used to generate the enhanced background when a user of the device requests that the image be displayed. In other embodiments, process 200 can be performed when the image is acquired, such as by a digital camera capturing the image, a scanner capturing the image, a module receiving the image from some other device or module, and so forth.

Thus, it can be seen that each of multiple images can have a different identified color based on the analysis of those images. The enhanced background is thus tailored to the specific image being output.

In one or more embodiments, the techniques discussed herein can also be applied to a collection of two or more images. These two or more images can be displayed concurrently, or alternatively separately. For example, the techniques discussed herein can analyze the colors in multiple images (e.g., as if the multiple images were a single image) to determine a background color. This background color would then be the same for each of the multiple images.

It should be noted that a variety of different techniques can be used to identify a color that represents a general tone of the image. Examples of such techniques are discussed in more detail below. Additionally, multiple different techniques can be used for the same image in order to identify multiple different colors that represent a general tone of the image. These multiple different colors can be saved with the image, and one of these multiple colors selected as the identified color when the image is output. The particular color selected can be selected automatically, or can be based on user preferences. For example, a user may specify that he or she prefers a particular one of these multiple different techniques and accordingly the color identified using that particular technique is selected when outputting the image for that user. Alternatively, the multiple different colors can be combined (e.g., averaged together) in order to generate a single color that represents a general tone of the image.

Figure 7:
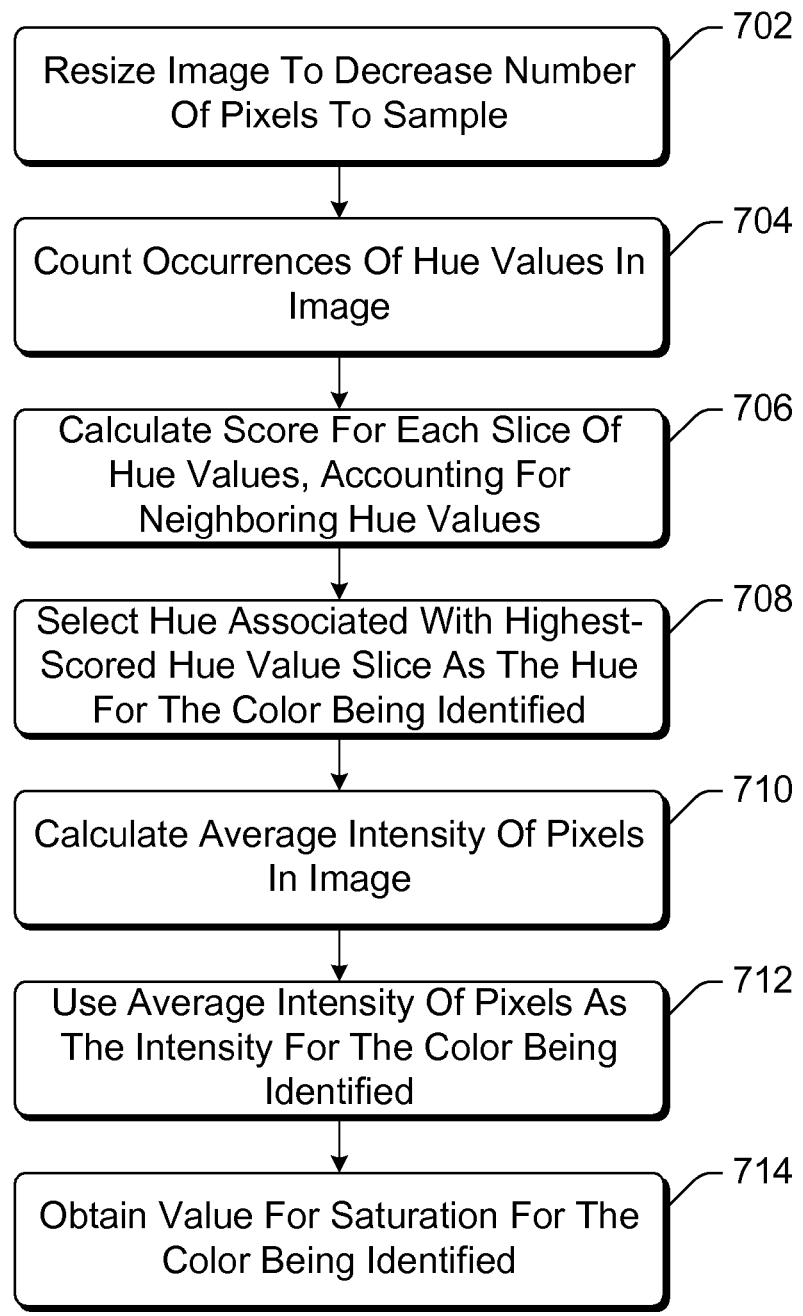
FIG. 7 is a flowchart illustrating an example process for identifying a color that represents a general tone of an image in accordance with one or more embodiments.

FIG. 7 is a flowchart illustrating an example process 700 for identifying a color that represents a general tone of an image in accordance with one or more embodiments. Process 700 describes an example technique for identifying a color that is expected to be perceived by humans as a general hue of an image. Process 700 is carried out by a device, such as a device implementing module 102 of FIG. 1, and can be implemented in software, firmware, hardware, or combinations thereof. In one or more embodiments, process 700 carries out act 204 of FIG. 2. Process 700 is an example process for identifying a color that represents a general tone of an image; additional discussions of identifying a color that represents a general tone of an image are included herein with reference to different figures.

Process 700 assumes that the image is described in the hue, saturation, value (HSV) color space. If the image is not in the HSV color space then the image is converted to the HSV color space prior to, or as part of, process 700. This conversion can be performed using one or more of a variety of different conventional processes or techniques. The specific manner in which this conversion is performed will vary based on the color space that the image is being converted from. Process 700 generates a color in the HSV color space that represents a general tone of the image, as discussed in more detail below.

In process 700, the image is resized to decrease the number of pixels to sample when identifying the color (acts 702). In one or more embodiments, the image is resized in act 702 to a fixed size while maintaining approximately the same aspect ratio of the image. This fixed size could be, for example, 32 pixels on the shorter edge of the image, although alternatively smaller or larger sizes could be used. For example, an image that is 1024×768 pixels (having an aspect ratio of 4:3) could be resized to 43×32 pixels. Alternatively, rather than resizing the image to a fixed size, the image could be resized by a particular factor (e.g., reducing both dimensions of the image by some factor). The resizing can be done using one or more of a variety of conventional image resizing algorithms or techniques. In other alternatives, no resizing of the image is performed (accordingly, act 702 need not be included in process 700).

The occurrences of different hue values in the image are then counted (act 704). As is known to those skilled in the art, hues in the HSV color space can be thought of as being distributed around a circle. As part of act 704, the circle is divided into multiple portions or slices, and the number of pixels in the image having a hue value within each of these portions or slices is counted. This counting can optionally be a weighted score based on the brightness of the pixels (the value or V component of the pixel in the HSV color space), so that the brighter the pixel is the more it contributes to the score of that portion or slice. This weighted score can also (or alternatively) be based at least in part on a location of the pixel in the image (e.g., pixels in the center of the image contribute more to the score of that portion or slice, pixels detected as being in a face in the image contributed more to the score of that portion or slice, and so forth). In one or more embodiments, the circle is divided into 255 portions or slices, although alternatively a larger or smaller number of portions or slices can be used. Accordingly, each of these slices or portions of hue values can have a count of zero or more.

A score for each slice of hue values is then calculated, taking into account neighboring hue values (acts 706). Each hue value slice has neighboring slices of varying distances. For example, a given hue value slice has an adjacent neighbor in both the clockwise and counterclockwise directions that are the closest neighbors for that hue value slice. Other hue value slices in both the clockwise and counterclockwise directions from that given hue value slice can also be neighbors, although they are further distances away.

In act 706, the score for a slice of hue values weighs the count for that slice most heavily, and assigns neighboring slices with different weights. The weight given to a count of a neighboring slice is dependent on how close the slice is to the slice for which the score is being calculated; closer neighboring slices are given heavier weights than further neighboring slices. The manner in which these weights are assigned can vary. In one or more embodiments, a Gaussian function is used to determine how much the count from a particular neighboring slice adds to the score for a given slice. Alternatively, other functions can be used, such as a linear function (e.g., counts from adjacent slices are given a weight of 0.8, counts from two slices away are given a weight of 0.6, counts from three slices away are given a weight of 0.4, counts from four slices away are given away to 0.2, and counts five or more slices away have a weight of 0.0 (e.g., they are not included in the score)).

In one or more embodiments, the following Gaussian function is used to determine how much the count from a particular neighboring slice adds to the score for a given slice:

$$f(x) = ae^{-\frac{(x-b)^2}{2c^2}}$$

where f(x) is the weight of a slice when its distance is x slices, a=0, b=0, and c=√50. It is to be appreciated that these values for a, b, and c are examples, and that other values can alternatively be used.

Given the scores of the hue value slices calculated in act 706, a hue value associated with the hue value slice having the highest score is selected as the hue for the color being identified in process 700 (act 708). The hue value associated with the hue value slice having the highest score can be identified in a variety of different manners. In one or more embodiments, the hue values from the image that are in the hue value slice are combined (e.g., averaged or otherwise) to obtain the hue value associated with that slice. In other embodiments, other techniques can be used, such as combining (e.g., averaging or otherwise) the possible hue values in that hue value slice, manually assigning (e.g., by a designer of process 700) a desired hue value to that slice, and so forth.

An average intensity of pixels in the image is also calculated (act 710). Alternatively, a value representing the intensity of the pixels in the image can be identified in manners other than averaging. For example, intensity values for pixels in different portions of the image (e.g., pixels in the center of the image, pixels detected as being in a face in the image, and so forth) can be weighted more heavily than intensity values for other pixels in the image. Additionally, not all pixels may be used in the averaging (or other techniques). For example, in act 710 intensity values for only pixels that are in the highest scored hue value slice in act 708 can be averaged or otherwise combined.

The average intensity of pixels calculated in act 710 is used as the intensity value for the color being identified in process 700 (act 712). Alternatively, if a technique other than averaging is used in act 710, then the result of such other technique is used in act 712.

A value for the saturation for the color being identified in process 700 is also obtained (act 714). In one or more embodiments, the value for the saturation in act 714 is set at a constant value. For example, the value for the saturation may be set at ⅔, although alternatively smaller or larger values can be used. In other embodiments, the value for the saturation in act 714 is calculated using other techniques. For example, the saturation values of pixels from the image that are in the highest scored hue value slice in act 708 can be combined (e.g., averaged or otherwise) to obtain the saturation value in act 714. By way of example, the saturation values of all pixels can be averaged or otherwise combined to obtain the saturation value in act 714. Such averaging or combining can optionally weight different pixels differently, such as based on where the pixels are located in the image (e.g., pixels in a face or other specified region being weighted more heavily).

As a result of process 700, a color in the HSV color space that represents the general tone of the image is generated. This color has a hue (the H component) as selected in act 708, a saturation (the S component) as selected in act 714, and a value (the V component) as determined in act 712.

Figure 8:
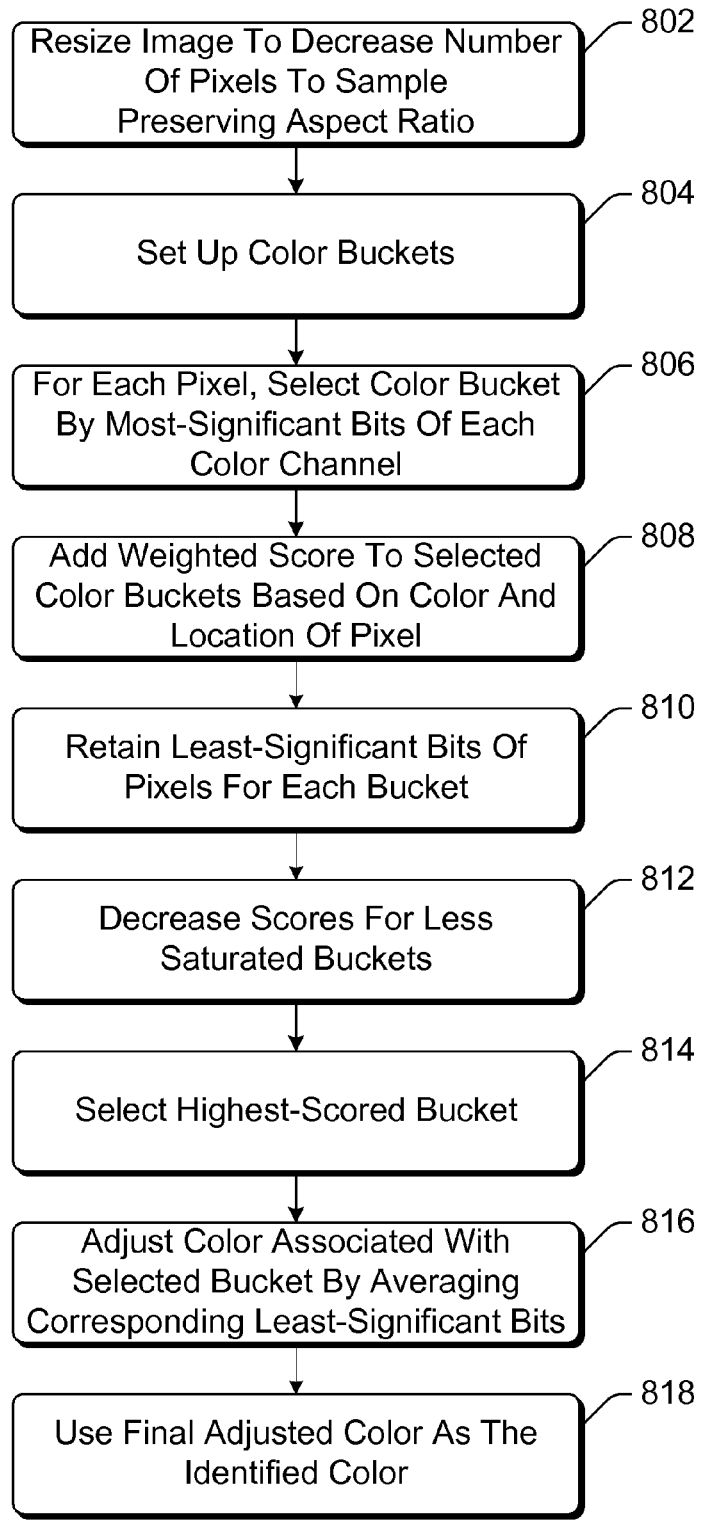
FIG. 8 is a flowchart illustrating an example process for identifying a color that represents a general tone of an image in accordance with one or more embodiments.

FIG. 8 is a flowchart illustrating an example process 800 for identifying a color that represents a general tone of an image in accordance with one or more embodiments. Process 800 describes an example technique for identifying a color that is expected to be perceived by humans as a most prominent color in the image. Process 800 is carried out by a device, such as a device implementing module 102 of FIG. 1, and can be implemented in software, firmware, hardware, or combinations thereof. In one or more embodiments, process 800 carries out act 204 of FIG. 2. Process 800 is an example process for identifying a color that represents a general tone of an image; additional discussions of identifying a color that represents a general tone of an image are included herein with reference to different figures.

Process 800 assumes that the image is described in the red, green, blue (RGB) color space. If the image is not in the RGB color space then the image is converted to the RGB color space prior to, or as part of, process 800. This conversion can be performed using one or more of a variety of different conventional processes or techniques. The specific manner in which this conversion is performed will vary based on the color space that the image is being converted from. Process 800 generates a color in the RGB color space that represents a general tone of the image, as discussed in more detail below.

In process 800, the image is resized to decrease the number of pixels to sample when identifying the color (acts 802). This resizing can be to a fixed size or by a particular factor, analogous to the discussion regarding act 702 of FIG. 7 above. The image is resized in a manner which preserves the aspect ratio of the original image, so that the color determination will reflect the original image with accuracy. In alternate embodiments, no resizing of the image is performed and accordingly act 802 need not be included in process 800.

Multiple color buckets or groups are set up (act 804). In one or more embodiments, the possible colors for the image are separated into a particular number of color buckets or groups. For example, the possible colors can be separated into $2^6=64$ different color buckets or groups, although alternatively a larger or smaller number of color buckets or groups can be used. The possible colors for the image can be separated into different color buckets or groups in a variety of different manners. In one or more embodiments, for each color the first two bits (e.g., the two most significant bits) of each of the values representing the R (red) component, the value representing the G (green) component, and the value representing the B (blue) component are used to identify one of the $2^6=64$ different buckets to which that color belongs. Alternatively, other techniques can be used for separating the possible colors into different color buckets or groups, such as using the first three bits of each of the values of the R, G, and B components, separating the possible colors into some other number of buckets (e.g., less than or greater than 64), and so forth.

For each pixel in the image, the color bucket for the pixel is selected by the most-significant bits of each color channel (act 806) and a weighted score is added to the selected color bucket based on a color of the pixel as well as a location of the pixel (act 808). Each color bucket has an associated score that is generated by having the weighted scores for each pixel added to it in act 808. To select (act 806) which bucket to add a weighted score to, the first two bits (e.g., the two most-significant bits) of each of the values representing the R (red) component, the value representing the G (green) component, and the value representing the B (blue) component of the pixel are identified. These 6 identified bits are then used to identify one of the $2^6=64$ different buckets to which the weighted score for that pixel is to be added. The least-significant bits of each pixel's color value (those not used to determine the color bucket) are also retained (act 810) for each bucket to be later used to adjust the final color selection.

The score added to the selected bucket is weighted based on a location of the pixel in the image. In one or more embodiments, a pixel in the center of the image is given a value of 1, and a pixel at the edge of the image is given a value of 0.25. Pixels in between the center and the edge of the image are assigned a value based on how close to the center (or image) the pixels are. This value can be determined linearly (e.g., a pixel one quarter of the way from the center to the edge following a ray beginning at the center of the image can be given a value of 0.75, a pixel halfway between the center and the edge following the ray can be given a value of 0.50, and so forth). A group of pixels near the center of the image can all be given a weight value of 1 to allow equal value for a region of pixels. Alternatively, other non-linear weights can be assigned to the pixels.

Alternatively, rather than weighting scores of pixels based on their proximity to the center of the image, scores of pixels can be weighted based on their proximity to other portions of the image. Such other portions can be, for example, faces, eyes, other detected features in the image, and so forth.

Although weighted scores are discussed as being added to the scores for each bucket in act 808, in an alternate embodiment non-weighted scores are used. In such embodiments, scores are added to color buckets based on the colors of the pixels without regard for the location of the pixels.

After each pixel in the image has been used to update the score of a color bucket in act 808, the scores for less saturated buckets are decreased (act 812). Which buckets are less saturated can be identified in different manners. In one or more embodiments, this determination of which buckets are less saturated is made manually by a designer of process 800. In other embodiments, this determination can be made automatically, such as a particular number (e.g., a fixed number or a percentage) of those buckets assigned a score greater than a threshold amount (e.g., greater than zero) having the lowest saturation values can be identified as being the less saturated buckets. Alternatively, act 812 can be optional and not performed in one or more embodiments.

The amount by which the scores are decreased in act 812 can vary. In one or more embodiments, the scores of the less saturated buckets are reduced by a factor of 8. Alternatively, factors greater than or less than 8 can also be used. In other embodiments, the scores of the less saturated buckets are reduced by a fixed amount (e.g., a value of 5, a value of 20, and so forth). Colors which are considered unwanted in the final selection can be reduced to zero. In one or more embodiments, the score of black pixels can be reduced to zero to eliminate black as a possible final color selection.

The highest scored bucket is then selected (act 814). The color associated with this highest scored bucket is determined. This color is then adjusted slightly by computing the average value of the least-significant-bits of pixels which corresponded to the selected bucket, and adding this average to each of the color channels used to describe the selected color (act 816). This adjusted color is used as the color that represents the identified color (act 818). The color associated with the highest scored bucket can be determined in a variety of different manners. In one or more embodiments, the values of the pixels in the highest scored bucket are combined (e.g., averaged or otherwise) to obtain the color associated with that bucket. In other embodiments, other techniques can be used, such as combining (e.g., averaging or otherwise) the possible color values in that bucket, manually assigning (e.g., by a designer of process 800) a desired color to that bucket, and so forth.

FIGS. 7 and 8 illustrate examples of processes for identifying a color that represents the general tone of an image. It is to be appreciated that these processes are only examples, and that alternatively other processes can be used. By way of example, the values (whether RGB values, HSV values, or other values) of all the pixels in the image in the pixel can be combined (e.g., averaged or otherwise) to identify the color that represents a general tone of the image, all the pixels in a particular region of the image (e.g., in one or more detected faces in the image) can be combined (e.g., averaged or otherwise) to identify the color that represents a general tone of the image, and so forth.

Accordingly, it can be seen that an enhanced background for each image is generated. This background is not a fixed color, but rather is enhanced by changing based on the individual image being displayed.

The image-based backgrounds for images discussed herein can be used in a variety of different situations, including displaying individual images, displaying slideshows of images, and so forth. In one or more embodiments, when displaying a slideshow of images, a fading technique or other image transition technique is used to provide a smooth or visually appealing transition from one image to another. This fading or transition applies to both the image as well as the enhanced background, so that a smooth or otherwise visually appealing transition is made for both the images and the enhanced backgrounds. Any of a variety of conventional transition processes or techniques can be used for this fading or other transition.

Additionally, it is to be appreciated that multiple images each with their own enhanced background can be displayed concurrently. For example, a screen may be separated into multiple different portions or frames, with an image being displayed in each of these portions. A separate enhanced background can be generated and displayed for each of these different portions.

Additionally, examples of the image-based backgrounds for images are discussed herein with reference to the RGB and HSV color spaces. It is to be appreciated, however, that the image-based backgrounds for images can be used with different color spaces. Examples of such color spaces include the CMYK (Cyan, Magenta, Yellow, Key (black)) color space, the Pantone Matching System color space, the L, a, b (also referred to as Lab) color space, and so forth. The image-based backgrounds for images can also be used with images that are output in different manners, including being displayed on a monitor, being displayed by a projector, being printed by a printing device (e.g., an inkjet, laser, or other type of printer), and so forth.

Figure 9:
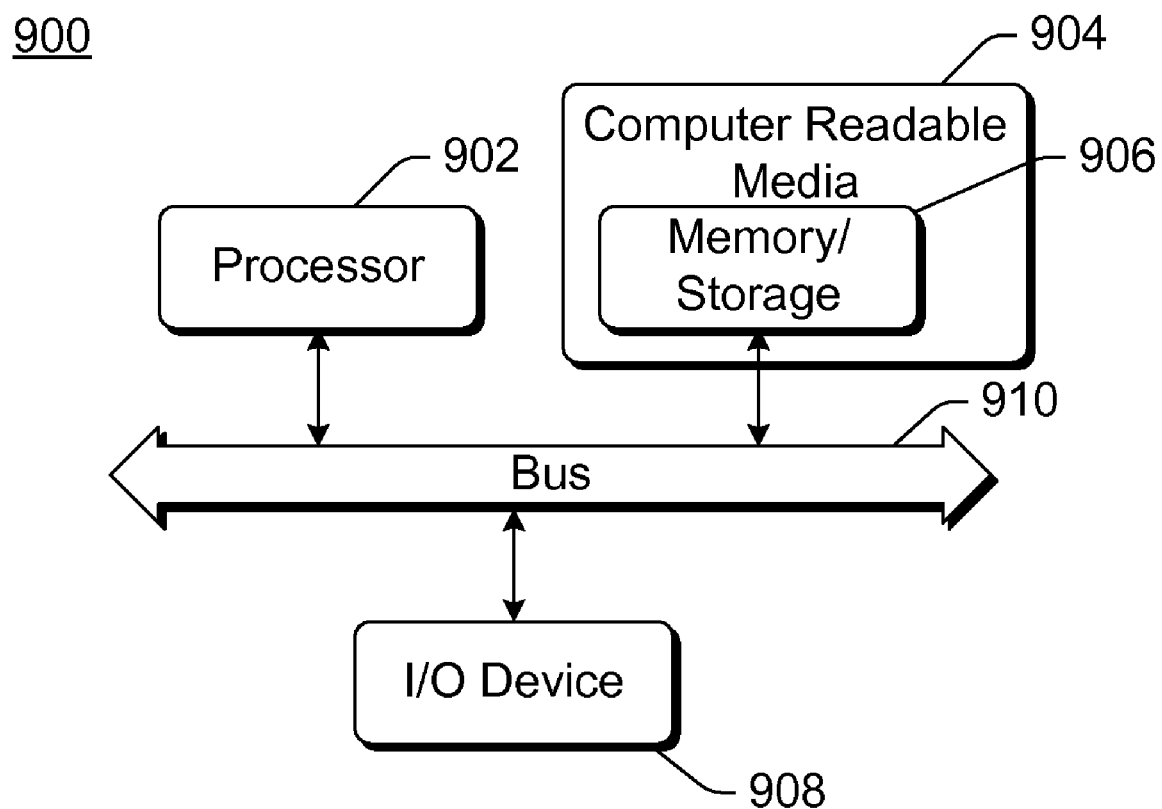
FIG. 9 illustrates an example computing device that can be configured to implement the image-based backgrounds for images in accordance with one or more embodiments.

FIG. 9 illustrates an example computing device 900 that can be configured to implement the image-based backgrounds for images in accordance with one or more embodiments. Computing device 900 can implement, for example, one or more of modules 102, 104, and/or 106 of FIG. 1.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or one or more I/O devices 908 can be included as part of, or alternatively may be coupled to, computing device 900. Bus 910 represents one or more of several types of bus structures, including a memory bus or memory controller, a peripheral bus, an accelerated graphics port, a processor or local bus, and so forth using a variety of different bus architectures. Bus 910 can include wired and/or wireless buses.

Memory/storage component 906 represents one or more computer storage media. Component 906 can include volatile media (such as random access memory (RAM)) and/or non-volatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 902. It is to be appreciated that different instructions can be stored in different components of computing device 900, such as in a processing unit 902, in various cache memories of a processing unit 902, in other cache memories of device 900 (not shown), on other computer readable media, and so forth. Additionally, it is to be appreciated that the location where instructions are stored in computing device 900 can change over time.

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term "module" as used herein generally represents software, firmware, hardware, and/or combinations thereof. In the case of a software implementation, the module represents program code that performs specified tasks when executed on a processor (e.g., CPU or CPUs). The program code can be stored in one or more computer storage media, further description of which may be found with reference to FIG. 9. The features of the image-based backgrounds for images described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
 analyzing an image in order to identify a color that represents the image, the analyzing including:
  separating possible colors for the image into a set of color buckets,
  for each pixel in the image, adding to a score of one color bucket of the set of color buckets a weighted score that is based at least in part on a proximity of a location of the pixel in the image to a particular portion of the image, the one color bucket for each pixel being determined based on a color of the pixel,
  decreasing the score of a color bucket associated with a particular color to eliminate the particular color as a possible color to represent the image;
  selecting a highest-scored bucket of the set of buckets, and
  using a color associated with the highest-scored bucket as the color that represents the image;
 generating an enhanced background based at least in part on the identified color; and
 outputting both the image and the enhanced background on a screen.

2. A method as recited in claim 1, the analyzing comprising identifying as the color that represents the image a particular color that is expected to be perceived by humans as a most prominent color in the image.

3. A method as recited in claim 2, the analyzing further comprising:
 resizing, prior to separating possible colors for the image into the set of color buckets, the image to decrease a number of pixels in the image.

4. A method as recited in claim 1, the analyzing further comprising decreasing, prior to selecting the highest-scored bucket, the score of each of one or more less saturated buckets.

5. A method as recited in claim 1, wherein the color associated with the highest-scored bucket comprises an average of colors of pixels in the highest-scored bucket.

6. A method as recited in claim 1, the analyzing comprising identifying as the color that represents the image a particular color that is expected to be perceived by humans as a general hue of the image.

7. A method as recited in claim 1, the outputting comprising outputting the enhanced background with a halo effect around the image.

8. A method as recited in claim 7, the generating the enhanced background comprising overlaying, on the color, a semi-transparent grayscale mask that includes a grayscale version of the enhanced background.

9. A method as recited in claim 1, further comprising saving the color that represents the image as being associated with the image.

10. A method as recited in claim 1, the particular portion of the image comprising a center of the image.

11. A method as recited in claim 1, the particular portion of the image comprising a face in the image.

12. A method as recited in claim 1, the decreasing comprising decreasing the score of the color bucket associated with the particular color to zero.

13. A method as recited in claim 1, the outputting further comprising outputting one or more image playback controls having a color based at least in part on the identified color.

14. One or more computer storage media having stored thereon multiple instructions that, when executed by one or more processors of a device, cause the one or more processors to:
analyze an image to identify a color that represents the image, the instructions causing the one or more processors to analyze the image including instructions causing the one or more processors to:
separate possible colors for the image into a set of color buckets,
for each pixel in the image, add to a score of one color bucket of the set of color buckets a weighted score that is based at least in part on a proximity of a location of the pixel in the image to a particular portion of the image, the one color bucket for each pixel being determined based on a color of the pixel,
decrease, for each of one or more color buckets associated with one or more particular colors that are unwanted as the color that represents the image, the score of each of the one or more color buckets to eliminate the one or more particular colors as possible colors to represent the image,
select a highest-scored bucket of the set of buckets, and
use a color associated with the highest-scored bucket as the color that represents the image; and
save the color as being associated with the image in order to be used to generate an enhanced background for the image when the image is displayed.

15. One or more computer storage media as recited in claim 14, wherein to save the color is to save the color as metadata in a data structure that includes image data for the image.

16. One or more computer storage media as recited in claim 14, wherein the enhanced background displays a halo effect around the image.

17. One or more computer storage media as recited in claim 14, the instructions causing the one or more processors to analyze the image further comprising instructions causing the one or more processors to decrease, prior to selection of the highest-scored bucket, the score of each of one or more less saturated buckets.

18. One or more computer storage media as recited in claim 17, the one or more less saturated buckets comprising a particular percentage of the set of color buckets having the lowest saturation values.

19. One or more computer storage media as recited in claim 14, the color associated with the highest-scored bucket comprising an average of colors of pixels in the highest-scored bucket.

20. A device comprising:
an image analysis module, implemented at least in part in hardware, to analyze an image to identify a color that represents the image by:
separating possible colors for the image into a set of color buckets,
for each pixel in the image, adding to a score of one color bucket of the set of color buckets a weighted score that is based at least in part on a proximity of a location of the pixel in the image to a particular portion of the image, the one color bucket for each pixel being determined based on a color of the pixel,
decreasing the score of each of one or more less saturated buckets, the decreasing further including decreasing the score of a color bucket associated with a particular color to eliminate the particular color as a possible color to represent the image,
selecting a highest-scored bucket of the set of buckets, and
using a color associated with the highest-scored bucket as the color that represents the image; and
a background color storage module to save the color as being associated with the image in order to be used to generate an enhanced background for the image when the image is displayed.

* * * * *